(No Model.)
W. A. PATERSON.
ROAD CART.
No. 456,369. Patented July 21, 1891.
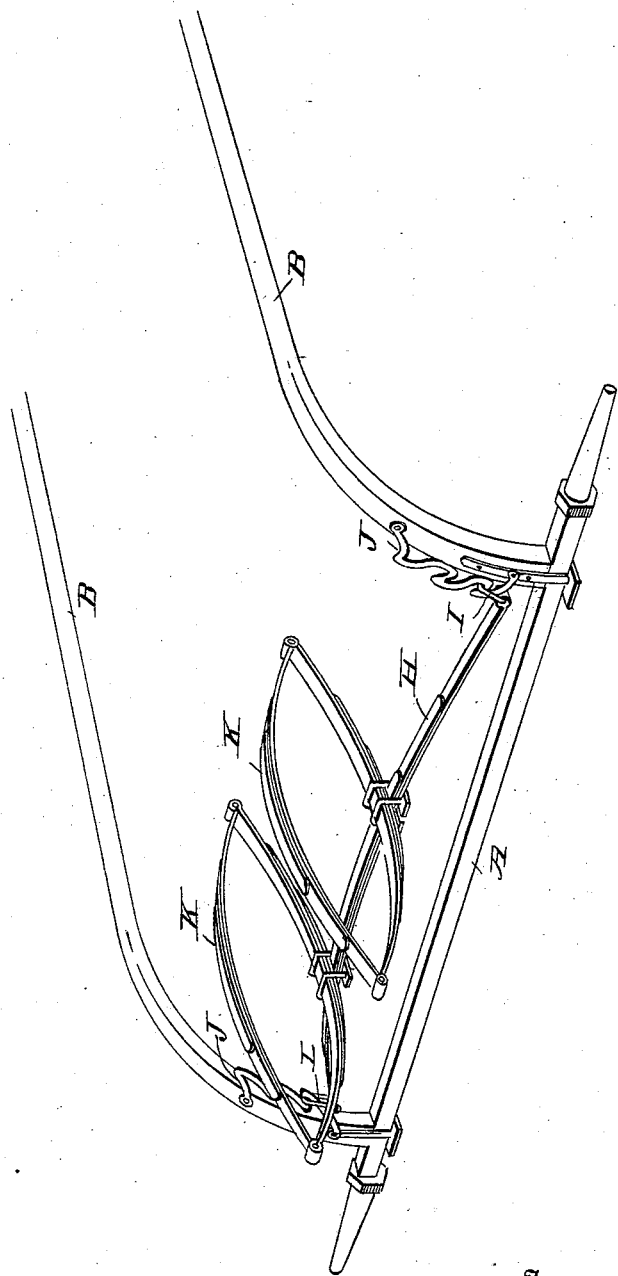
Witnesses
F. R. Cornwall
L. S. Bacon
Inventor
W. A. Paterson
By his Attorney
Thos. S. Sprague & Son

UNITED STATES PATENT OFFICE.

WILLIAM A. PATERSON, OF FLINT, MICHIGAN.

ROAD-CART.

SPECIFICATION forming part of Letters Patent No. 456,369, dated July 21, 1891.

Application filed October 27, 1890. Serial No. 369,440. (No model.)

*To all whom it may concern:*

Be it known that I, WILLIAM A. PATERSON, a citizen of the United States, residing at Flint, in the county of Genesee and State of Michigan, have invented certain new and useful Improvements in Road-Carts, of which the following is a specification, reference being had therein to the accompanying drawings.

This invention relates to new and useful improvements in two-wheeled vehicles; and the invention consists in the peculiar construction of the support for the seat whereby an easy-riding vehicle is constructed and whereby the horse motion is overcome in the most efficient manner, all as more fully hereinafter described.

The figure is a perspective view of a modification thereof.

A is the axle.

B are the shafts.

In the present state of the art semi-elliptical springs have been used to support the seat, the ends of such springs being suspended from a link free to swing, such links engaging with brackets on the shaft or axle and having suitable means for raising and lowering the same.

My invention is intended to be an improvement upon such construction; and it consists in the use of a cross-bar H, having suitable eyes formed at its ends, in which are secured links I, engaging with suitable brackets J, having a series of hooks, said brackets being secured to the shafts or axles, as desired, all so arranged that the cross-bar is free to have a swinging motion upon its suspending links. This cross-bar may be a rigid bar or it may be a semi-elliptical spring, as in constructions heretofore used. Upon this swinging cross-bar is secured the seat-supporting spring. This seat-supporting spring may be of any suitable construction; but I preferably use an elliptical spring K, either one or two, according to the style of cart desired to be built.

I have shown two elliptical springs arranged transversely the cross-bar at either end thereof and a connecting seat-bar secured to the upper side thereof, upon which the body and seat are secured.

This construction of cart gives a minimum of the so-called "horse motion," the said motion being taken up by the swinging links, while the elliptic spring is left free to take up the jolting due to the inequalities of the road.

What I claim as my invention is—

In a road-cart, the combination of a cross-bar suspended at its ends by links from the shafts, two elliptical springs clipped thereon near the ends, and a seat secured upon said elliptical springs, substantially as described.

In testimony whereof I affix my signature in presence of two witnesses.

WILLIAM A. PATERSON.

Witnesses:
DON. L. GLENDENING,
THOS. P. WEBSTER.